(12) United States Patent
Takamura

(10) Patent No.: US 11,153,459 B2
(45) Date of Patent: Oct. 19, 2021

(54) IMAGE FORMING APPARATUS THAT PRINTS A PLURALITY OF SOURCE DOCUMENT IMAGES ON ONE RECORDING SHEET IN A CONSOLIDATED FORM

(71) Applicant: KYOCERA Document Solutions Inc., Osaka (JP)

(72) Inventor: Haruna Takamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/886,992

(22) Filed: May 29, 2020

(65) Prior Publication Data

US 2020/0382675 A1    Dec. 3, 2020

(30) Foreign Application Priority Data

May 31, 2019   (JP) .............................. JP2019-103312

(51) Int. Cl.
*H04N 1/203* (2006.01)
*H04N 1/00* (2006.01)
*G06F 3/12* (2006.01)
*G06F 3/048* (2013.01)

(52) U.S. Cl.
CPC ........... *H04N 1/2036* (2013.01); *G06F 3/048* (2013.01); *G06F 3/122* (2013.01); *G06F 3/1203* (2013.01); *H04N 1/00411* (2013.01)

(58) Field of Classification Search
None
See application file for complete search history.

(56) References Cited

U.S. PATENT DOCUMENTS

2007/0070442 A1\* 3/2007 Ohkubo ............. H04N 1/00442
  358/451
2014/0054364 A1\* 2/2014 Yamauchi .......... H04N 1/32144
  235/375

FOREIGN PATENT DOCUMENTS

JP    2008-042276 A    2/2008

\* cited by examiner

*Primary Examiner* — Lennin R Rodriguezgonzalez
(74) *Attorney, Agent, or Firm* — IP Business Solutions, LLC

(57) ABSTRACT

An image forming apparatus includes an image reading device, an image forming device, and a control device. The image reading device reads a source document image. The image forming device forms the source document image read by the image reading device, on a recording sheet. The control device includes a processor, and acts as a controller, when the processor executes a control program. The controller arranges a plurality of source document images sequentially read by the image reading device, in a consolidated form in an area corresponding to one recording sheet, and causes the image forming device to record the source document images on one recording sheet.

3 Claims, 10 Drawing Sheets

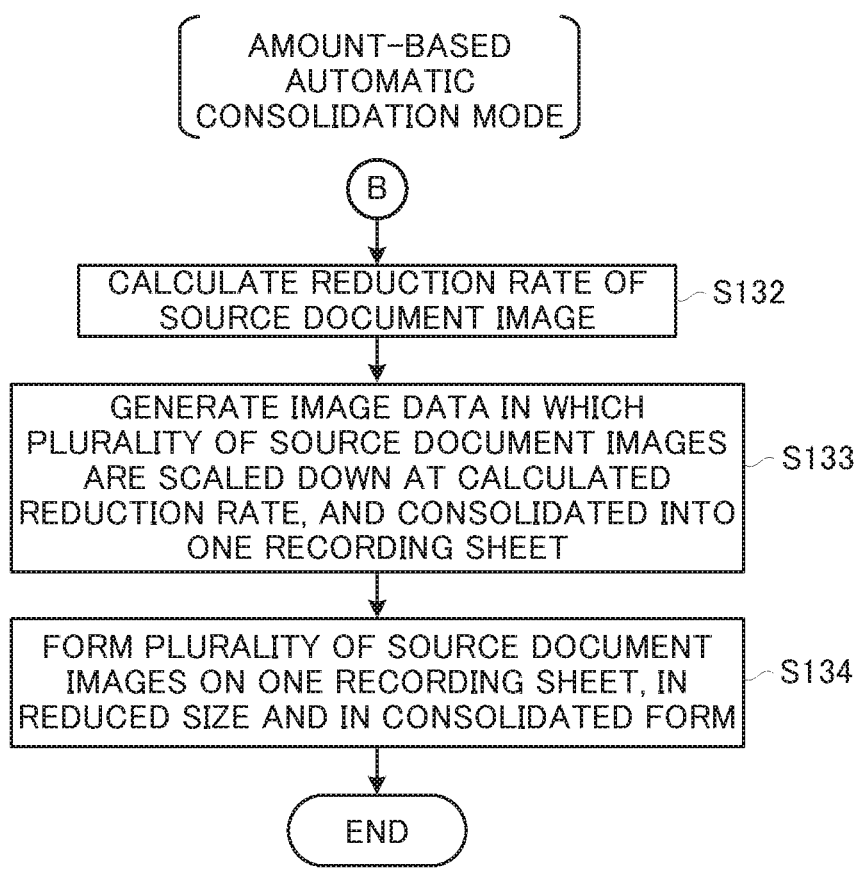

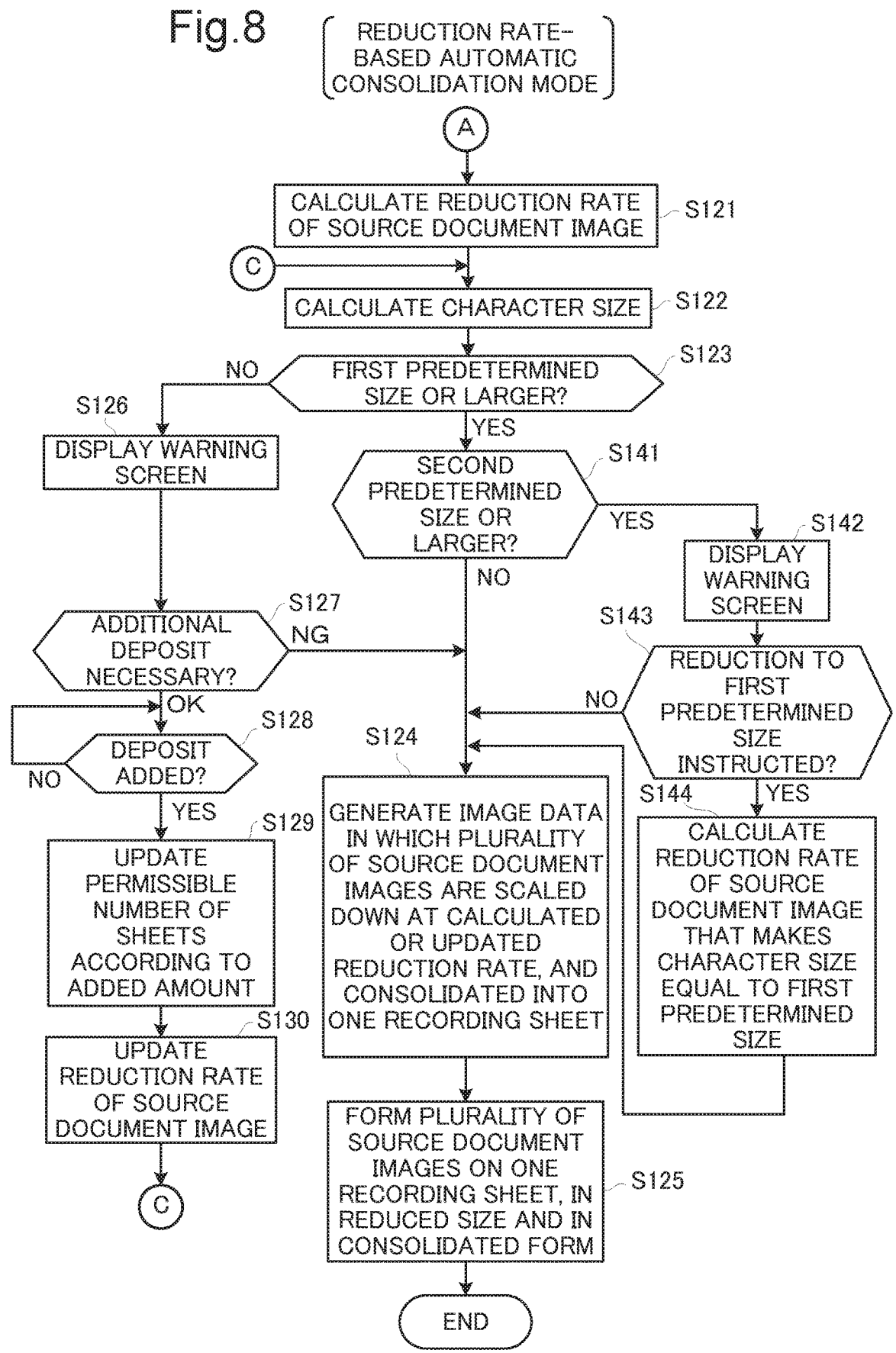

IMAGE FORMING APPARATUS THAT PRINTS A PLURALITY OF SOURCE DOCUMENT IMAGES ON ONE RECORDING SHEET IN A CONSOLIDATED FORM

INCORPORATION BY REFERENCE

This application claims priority to Japanese Patent Application No. 2019-103312 filed on May 31, 2019, the entire contents of which are incorporated by reference herein.

BACKGROUND

The present disclosure relates to an image forming apparatus that prints an image of a source document on a recording sheet, and in particular to a technique to edit images of a plurality of source documents, and print the edited image on the recording sheet.

With existing image forming apparatuses, a source document image can be read by an image reading device, and the source document image can be printed on a recording sheet, by an image forming device. Alternatively, an image edited by an information processing apparatus (e.g., personal computer) can be received through a network from the information processing apparatus, and such image can be printed on a recording sheet, with the image forming device. With an image forming apparatus of a different type, a file can be received from an information processing apparatus through a network, an image can be read by a scanner, and the received file and the read image can be edited, to be printed on a recording sheet.

SUMMARY

The disclosure proposes further improvement of the foregoing technique.

In an aspect, the disclosure provides an image forming apparatus including an image reading device, an image forming device, and a control device. The image reading device reads a source document image. The image forming device forms the source document image read by the image reading device, on a recording sheet. The control device includes a processor, and acts as a controller, when the processor executes a control program. The controller arranges a plurality of source document images sequentially read by the image reading device, in a consolidated form in an area corresponding to one recording sheet, and causes the image forming device to record the source document images on one recording sheet.

BRIEF DESCRIPTION OF THE DRAWINGS

FIG. 3C is a flowchart showing another process that follows the process of FIG. 3A.

FIG. 8 is a flowchart showing still another process that follows the process of FIG. 3A.

DETAILED DESCRIPTION

Hereafter, an embodiment of the disclosure will be described, with reference to the drawings.

Figure 1:
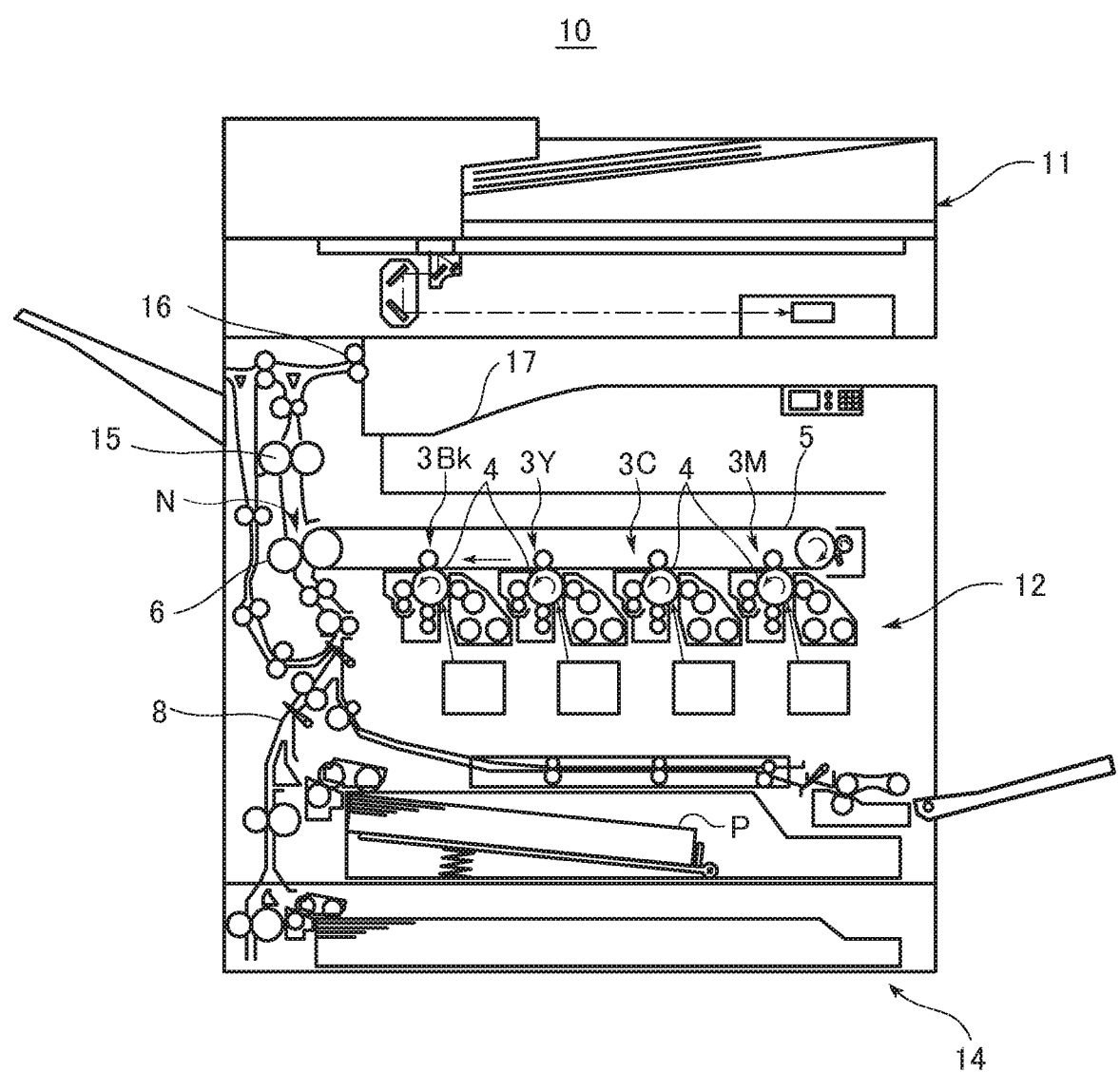
FIG. 1 is a cross-sectional view of an image forming apparatus according to an embodiment of the disclosure.

FIG. 1 is a cross-sectional view of an image forming apparatus according to the embodiment of the disclosure. As shown in FIG. 1, the image forming apparatus 10 according to this embodiment is what is known as a copier, and includes an image reading device 11 and an image forming device 12.

The image reading device 11 is a scanner that optically reads an image of a source document. For example, the image reading device 11 includes an image sensor, such as a charge coupled device (CCD), that optically reads the source document image, and the analog output from the image sensor is converted into a digital signal, so that image data representing the source document image is generated. In addition, the image reading device 11 may either read, with the image sensor, the source document image placed on a platen glass, or read the source document image transported by an automatic document feeder (ADF), configured to pick up and transport a plurality of source documents set on a document tray, one by one.

The image forming device 12 is configured to print an image represented by the image data on a recording sheet, and includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer roller 5, as primary transfer. Thus, the color toner image is formed on the intermediate transfer roller 5. The color toner image is transferred, as secondary transfer, to the recording sheet P transported along a transport route 8 from a paper feed device 14, at a nip region N defined between the intermediate transfer roller 5 and a secondary transfer roller 6.

Thereafter, the recording sheet P is press-heated in a fixing device 15, so that the toner image on the recording sheet P is fixed by thermal compression, and then the recording sheet P is discharged to an output tray 17 through a discharge roller 16.

Figure 2:
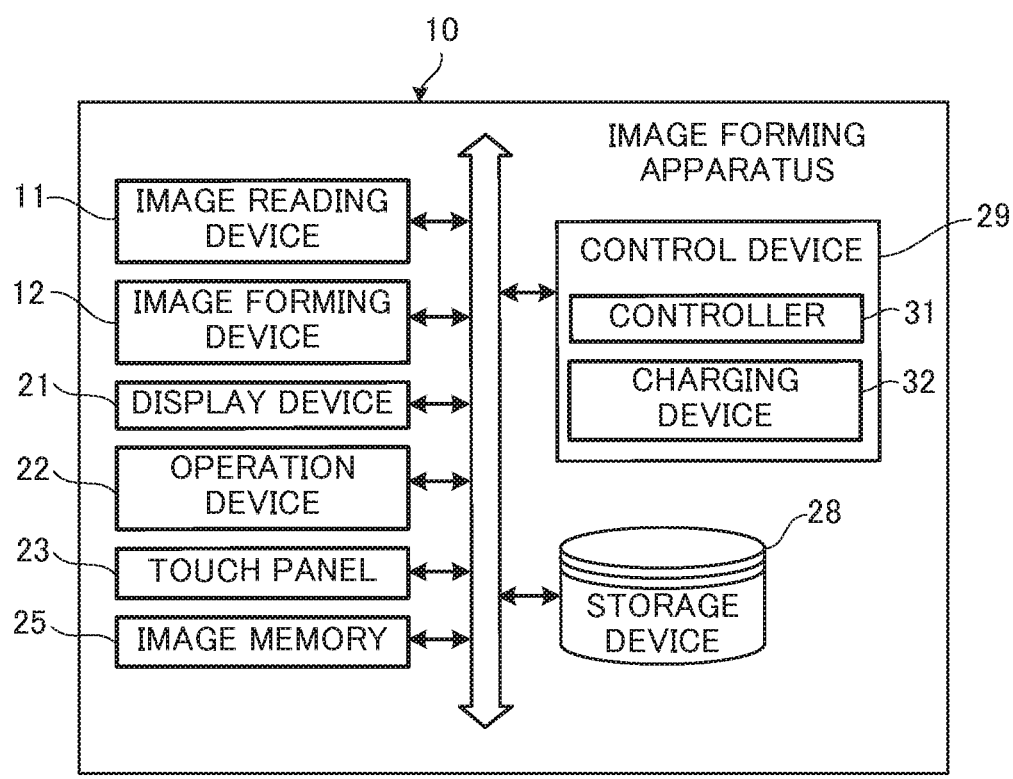
FIG. 2 is a block diagram showing an essential internal configuration of the image forming apparatus according to the embodiment.

FIG. 2 is a block diagram showing an essential internal configuration of the image forming apparatus 10 according to this embodiment. As shown in FIG. 2, the image forming apparatus 10 according to this embodiment includes the image reading device 11, the image forming device 12, a display device 21, an operation device 22, a touch panel 23, an image memory 25, a storage device 28, and a control device 29. The mentioned components are configured to transmit and receive data or signals to and from each other, via a bus.

The display device 21 is, for example, constituted of a liquid crystal display (LCD) or an organic light-emitting diode (OLED) display.

The operation device 22 includes physical keys such as a tenkey, an enter key, and a start key.

A touch panel 23 is overlaid on the screen of the display device 21. The touch panel 23 is based on a resistive film or electrostatic capacitance, and configured to detect a contact (touch) of the user's finger, along with the touched position, and outputs a detection signal indicating the coordinate of the touched position, to a controller 31 of the control device 29 to be subsequently described. The touch panel 23 serves, in collaboration with the operation device 22, as an operation device for receiving an instruction of the user inputted through the screen of the display device 21.

In the image memory 25, for example the image data, representing the source document image read by the image reading device 11, is stored.

The storage device 28 is a large-capacity storage device such as a solid-state drive (SSD) or a hard disk drive (HDD), and contains various application programs and various types of data.

The control device 29 includes a processor, a random-access memory (RAM), a read-only memory (ROM), and so forth. The processor is, for example, a central processing unit (CPU), an application specific integrated circuit (ASIC), or a micro processing unit (MPU). The control device 29 acts as a controller 31 and a charging device 32, when the processor executes a control program stored in the ROM or the storage device 28.

The controller 31 executes overall control of the image forming apparatus 10. The control device 29 is connected to the image reading device 11, the image forming device 12, the display device 21, the operation device 22, the touch panel 23, the image memory 25, and the storage device 28. The controller 31 controls the operation of the mentioned components, and transmits and receives data and signals to and from each of those components.

The controller 31 serves as a processing device that executes various operations necessary for the image forming to be performed by the image forming apparatus 10. Further, the controller 31 receives operational instructions inputted by the user, in the form of a detection signal outputted from the touch panel 23, or through a press of a physical key of the operation device 22. The controller 31 is also configured to control the display operation of the display device 21. Further, the controller 31 processes the image data stored in the image memory 25.

The charging device 32 calculates the number of recording sheets (permissible number of sheets to be printed), on the basis of the amount that the user has deposited in a non-illustrated coin vendor.

In the image forming apparatus 10 configured as above, the controller 31 sets either of a normal mode, in which the source document image is recorded on one recording sheet, and a consolidation mode, in which a plurality source document images are consolidated, to be recorded on one recording sheet.

In the normal mode, when the user sets one or more source documents on the image reading device 11, and inputs an instruction to copy the source documents, through the start key of the operation device 22, the controller 31 causes the image reading device 11, according to the instruction inputted, to sequentially read the source document images, stores the image data representing the source document images in the image memory 25, and then causes the image forming device 12 to form each of the source document images, represented by the image data in the image memory 25, on one recording sheet. Therefore, one source document image is printed on one recording sheet.

In the consolidation mode, the controller 31 selectively sets a manual consolidation mode or an automatic consolidation mode, according to the instruction inputted by the user through the operation device 22. Hereinafter, it will be assumed that, when the respective images of a plurality of source documents are consolidated into one recording sheet, the recording sheet of the same size as that of the source document is utilized.

In the manual consolidation mode, the controller 31 forms images on one recording sheet, on the basis of the number of source documents, with respect to which the user has instructed to consolidate the respective images into one recording sheet. For example, the user instructs, through the operation device 22, to consolidate two source document images into one recording sheet, sets a plurality of source documents on the image reading device 11, and instructs to execute copying by pressing the start key of the operation device 22. According to the user's instruction, the controller 31 causes the image reading device 11 to sequentially read the source document images, and stores the image data representing the source document image in the image memory 25, each time the source document image is read. Then the controller 31 sequentially selects two of the source document images, and generates image data, in which the two source document images are scaled down and consolidated into one page, on the basis of the image data in the image memory 25, representing each of the two source document images selected. The controller 31 causes the image forming device 12 to acquire the image data generated as above from the image memory 25, and form the consolidated source document images represented by the image data, on one recording sheet. Therefore, two of the plurality of source document images are sequentially selected and scaled down, so that two source document images are consolidated and printed on one recording sheet.

In the automatic consolidation mode, the controller 31 selectively sets an amount-based automatic consolidation mode or a reduction rate-based automatic consolidation mode. As will be described in further detail, one of the mentioned modes is automatically selected. In the amount-based automatic consolidation mode, for example, when the user sets a plurality of source documents on the image reading device 11, and instructs to execute copying by pressing the start key of the operation device 22, the controller 31 causes the image reading device 11 to sequentially read the source document images, and stores the image data representing the source document image in the image memory 25, each time the source document image is read. Further, the charging device 32 calculates a permissible number of recording sheets that can be printed within the amount that the user has deposited in the coin vendor. The controller 31 calculates the number of source document images that can be consolidated into one recording sheet, by dividing the number of source documents read by the image reading device 11 by the permissible number of recording sheets, and also calculates a reduction rate of the source document images that allows the calculated number of source document images to be consolidated into one recording sheet, on the basis of the number of source document images, the size of the source document images, and the size of the recording sheet. The controller 31 then generates image data in which the source document images are each scaled down at the reduction rate calculated as above and consolidated into one recording sheet, on the basis of the image data in the image memory 25, representing each of the source document images. The controller 31 causes the image forming device 12 to acquire the image data generated as above from the image memory 25, and form the consolidated source document images represented by the image data, on one recording sheet. Thus, the source document images are scaled down, consolidated, and printed, on each of the permissible number of recording sheets available within the amount deposited in the coin vendor.

In the reduction rate-based automatic consolidation mode, for example, when the user sets a plurality of source documents on the image reading device 11, and instructs to execute copying by pressing the start key of the operation device 22, the controller 31 causes the image reading device 11 to sequentially read the source document images, and stores the image data representing the source document image in the image memory 25, each time the source document image is read. Further, the charging device 32 calculates a permissible number of recording sheets that can be printed within the amount that the user has deposited in the coin vendor. The controller 31 calculates the number of source document images that can be consolidated into one recording sheet, by dividing the number of source documents read by the image reading device 11 by the permissible number of recording sheets, and also calculates the reduction rate of the source document images that allows the calculated number of source document images to be consolidated into one recording sheet, on the basis of the number of source document images, the size of the source document images, and the size of the recording sheet. The controller 31 then generates the image data in which the source document images are each scaled down at the reduction rate calculated as above and consolidated into one recording sheet, in the case where the size of characters in the source document image is equal to or larger than a first predetermined size, after the source document images are scaled down at the reduction rate calculated as above. The controller 31 causes the image forming device 12 to acquire the image data generated as above from the image memory 25, and form the consolidated source document images represented by the image data, on one recording sheet. Thus, the character size equal to or larger than the first predetermined size can be secured, in the source document images scaled down and consolidated into one recording sheet.

Referring now to flowcharts of FIG. 3A, FIG. 3B, and FIG. 3C, the operation process of the normal mode, the manual consolidation mode, and the automatic consolidation mode (amount-based automatic consolidation mode and reduction rate-based automatic consolidation mode) will be described in detail.

Figure 4:
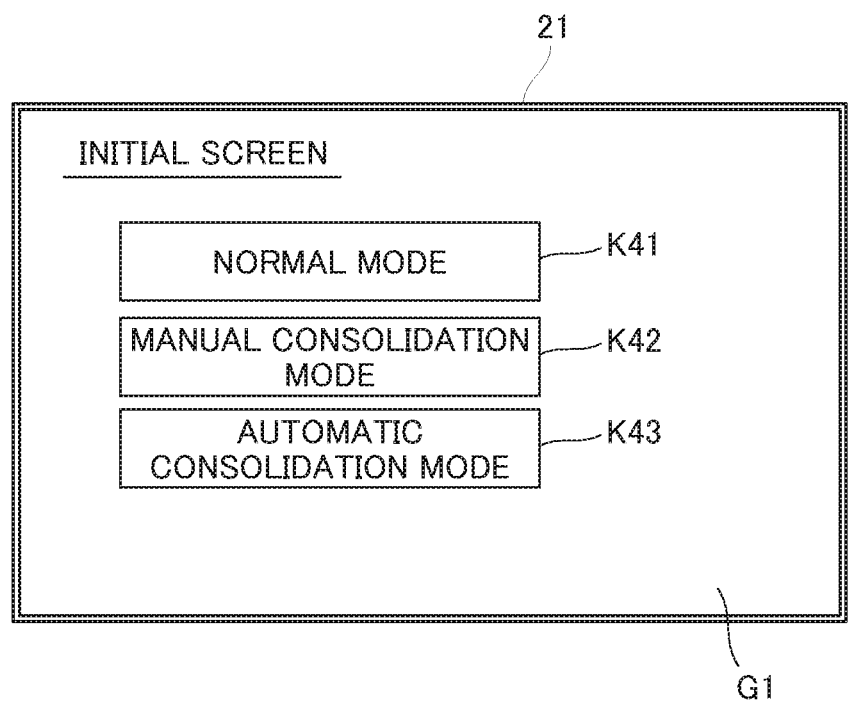
FIG. 4 is a schematic drawing showing an initial screen displayed on a display device of the image forming apparatus.

First, the controller 31 causes the display device 21 to display an initial screen G1, for example as shown in FIG. 4. The initial screen G1 includes mode keys K41 to K43, respectively associated with the normal mode, the manual consolidation mode, and the automatic consolidation mode. When the user touches the mode key K41 associated with the normal mode, on the initial screen G1, the controller 31 receives the normal mode setting instruction associated with the mode key K41, through the touch panel 23 ("NORMAL" at S101), and sets the normal mode (S102).

In the normal mode set as above, the user deposits a certain amount in the coin vendor, sets one or more source documents on the image reading device 11, and instructs to copy the source documents, by pressing the start key of the operation device 22. The controller 31 receives the copying instruction (S103). The charging device 32 receives the information of the deposited amount from the coin vendor, and calculates the permissible number of sheets that can be printed within the deposited amount, by dividing the deposited amount by the fee for printing of one recording sheet (S104). The controller 31 causes the image reading device 11 to read the source document images (S105), according to the copying instruction received at S103. At this point, the controller 31 permits the image reading device 11 to read the source documents up to the permissible number of sheets calculated at S104, and stores the image data representing the source document image in the image memory 25, each time the source document image is read. The controller 31 causes the image forming device 12 to form the source document image represented by the image data on the recording sheet, each time the image data is stored in the image memory 25 (S106). Thus, each source document image is printed on one recording sheet.

Figure 5:
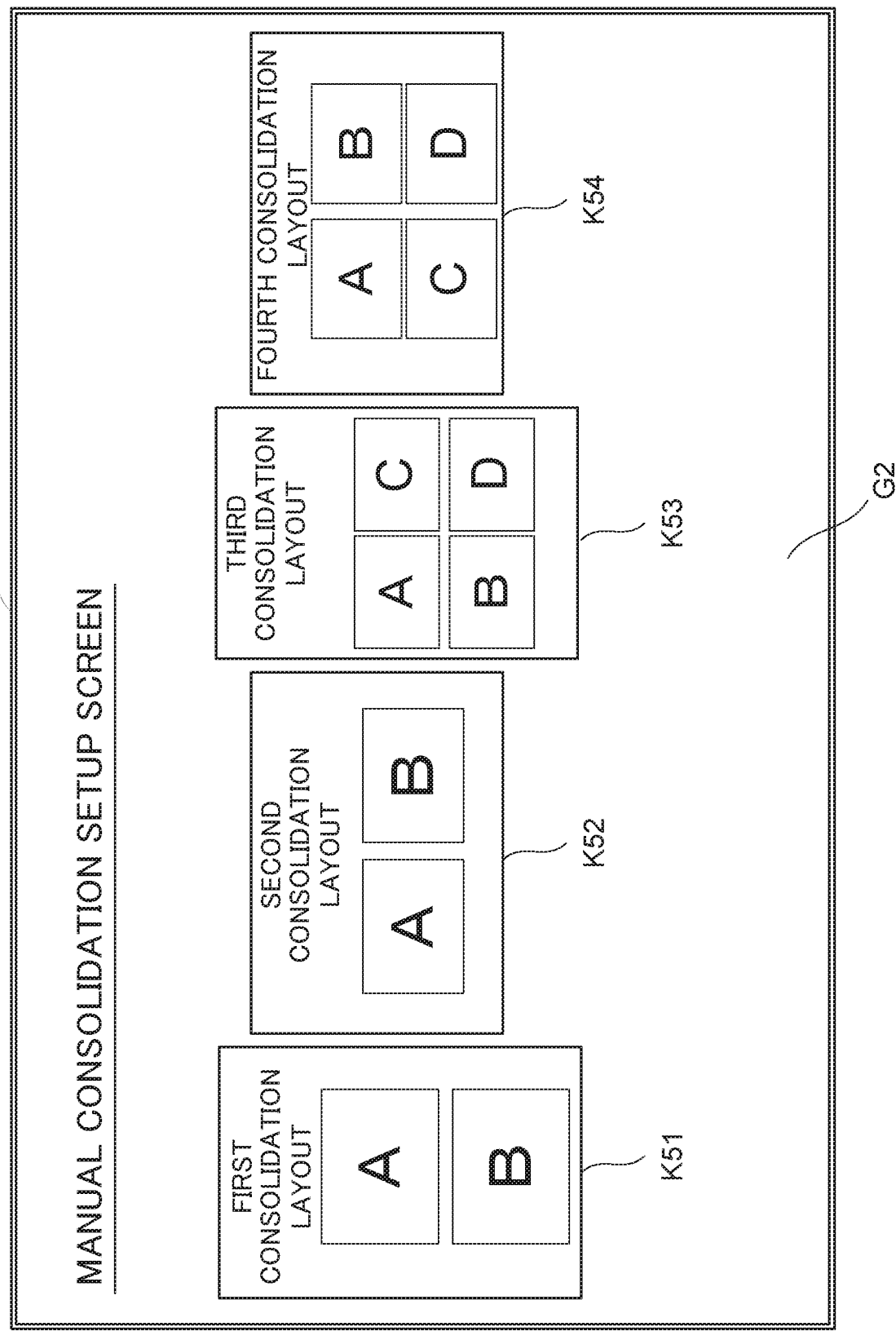
FIG. 5 is a schematic drawing showing a manual consolidation setup screen displayed on the display device.

When the user touches the mode key K42 associated with the manual consolidation mode, the controller 31 receives, through the touch panel 23, the instruction to set the manual consolidation mode associated with the mode key K42 (MANUAL CONSOLIDATION at S101), and sets the manual consolidation mode (S107). Upon setting the manual consolidation mode, the controller 31 causes the display device 21 to display a manual consolidation setup screen G2, for example as shown in FIG. 5 (S108). The manual consolidation setup screen G2 shown in FIG. 5 includes a first consolidation layout key K51 for consolidating two source document images on one recording sheet, and vertically aligning the images, a second consolidation layout key K52 for consolidating two source document images on one recording sheet, and horizontally aligning the images, a third consolidation layout key K53 for consolidating four source document images on one recording sheet, and vertically aligning the images in two rows, and a fourth consolidation layout key K54 for consolidating four source document images on one recording sheet and vertically aligning the images in two columns.

For example, when the user touches the second consolidation layout key K52, the controller 31 receives, through the touch panel 23, the instruction to create the second consolidation layout associated with the second consolidation layout key K52, and selects the horizontal layout of two source document images (second consolidation layout) associated with the second consolidation layout key K52 (S109). Then the user deposits a certain amount in the coin vendor, sets a plurality of source documents on the image reading device 11, and instructs to copy the source documents, by pressing the start key of the operation device 22. The controller 31 receives the copying instruction (S110). The charging device 32 calculates the permissible number of sheets, on the basis of the information of the deposited amount from the coin vendor (S111). The controller 31 permits the image reading device 11 to read the source document images, according to the copying instruction received at S110, up to the permissible number of sheets calculated at S111, and stores the image data representing the source document image in the image memory 25, each time the source document image is read (S112). Since the horizontal layout of two source document images associated with the second consolidation layout key K52 has been selected at S109, the controller 31 sequentially selects two of the source document images from the images read by the image reading device 11, and generates the image data in which the two source document images are scaled down, consolidated into one page, and horizontally aligned, on the basis of the image data representing the two source document images, in the image memory 25 (S113). The controller 31 causes the image forming device 12 to acquire the image data generated as above from the image memory 25, and form the source document images each represented by the image data on one recording sheet (S114). Thus, two of the plurality of source document images are sequentially selected, scaled down, and formed on one recording sheet in the horizontal layout.

When the user touches the mode key K43 associated with the automatic consolidation mode, the controller 31 receives, through the touch panel 23, the instruction to set the automatic consolidation mode associated with the mode key K43 (AUTOMATIC CONSOLIDATION at S101), and sets the automatic consolidation mode (S115).

The user deposits a certain amount in the coin vendor, sets a plurality of source documents on the image reading device 11, and instructs to copy the source documents, by pressing the start key of the operation device 22. The controller 31 receives the copying instruction (S116). The charging device 32 calculates the permissible number of sheets, on the basis of the information of the deposited amount from the coin vendor (S117). The controller 31 causes the image reading device 11 to read all of the source document images, according to the copying instruction received at S116, and stores the image data representing the source document image in the image memory 25, each time the source document image is read by the image reading device 11 (S118).

Then the controller 31 decides whether any characters are contained in the source document images in the image memory 25, by recognizing and extracting characters in the source document images, using a known optical character recognition (OCR) function (S119). Upon deciding that characters are contained in the source document image (Yes at S119), the controller 31 sets the reduction rate-based automatic consolidation mode (S120). Here, it is preferable to employ the OCR function capable of recognizing both of typed characters and hand-written characters.

In this case, the controller 31 counts the number of source documents read by the image reading device 11 and stored in the image memory 25, and calculates the number of source documents that can be consolidated into one recording sheet, by dividing the number of source documents counted, by the permissible number of sheets calculated at S117. The controller 31 also calculates the reduction rate of the source document images that allows the calculated number of source document images to be consolidated into one recording sheet, on the basis of the number of source document images, the size of the source document images, and the size of the recording sheet (S121). The controller 31 then calculates the size of the characters in the source document images to be adopted when the source document images are scaled down at the reduction rate calculated as above to be printed on one recording sheet (S122), and decides whether the calculated character size is equal to or larger than the first predetermined size (S123). Here, it will be assumed that the character size equal to or larger than the first predetermined size allows the characters printed on the recording sheet to be visually recognized, and that the character size smaller than the first predetermined size makes it difficult to visually recognize the characters printed on the recording sheet.

Upon deciding that the character size is equal to or larger than the first predetermined size, in other words that the characters printed on the recording sheet can be visually recognized (Yes at S123), the controller 31 generates the image data in which the calculated number of source document images are scaled down at the calculated reduction rate, and consolidated into one page, on the basis of the image data in the image memory 25 representing each of the source document images (S124). The controller 31 causes the image forming device 12 to acquire the image data generated as above from the image memory 25, and form the source document images each represented by the image data on one recording sheet (S125). Thus, the character size equal to or larger than the first predetermined size can be secured, so that the characters in the source document images printed on the recording sheet can be visually recognized.

Figure 6:
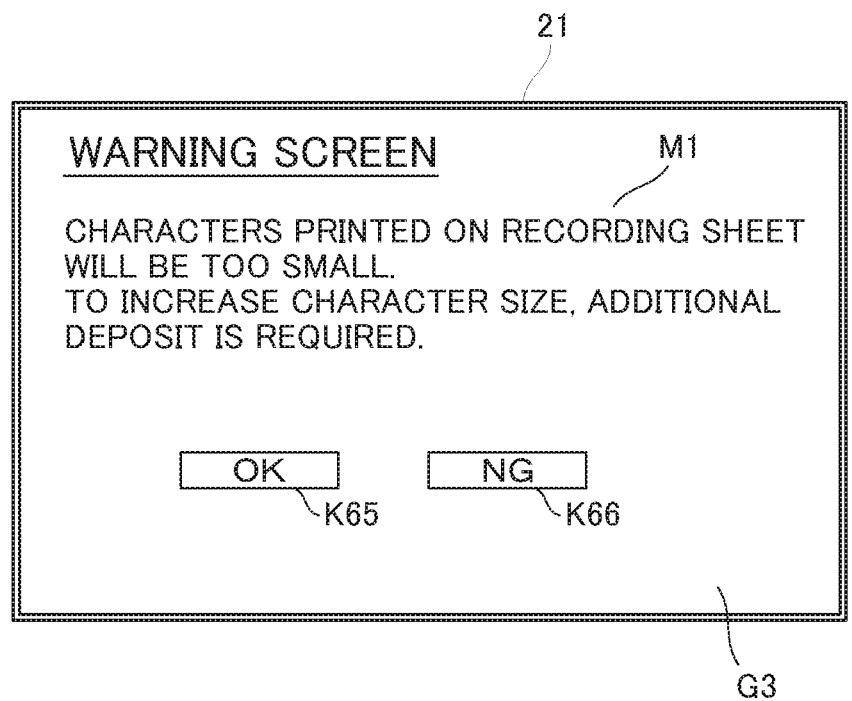
FIG. 6 is a schematic drawing showing a warning screen displayed on the display device.

In contrast, upon deciding that the character size is smaller than the first predetermined size, in other words that the characters printed on the recording sheet are difficult to visually recognize (No at S123), the controller 31 causes the display device 21 to display a warning screen G3, for example as shown in FIG. 6 (S126). The warning screen G3 shown in FIG. 6 includes a message M1 urging the user to deposit an additional amount in the coin vendor to thereby increase the permissible number of recording sheets, because the characters printed on the recording sheet are likely to be difficult to visually recognize, an OK key K65, and an NG key K66.

When the user touches the OK key K65 in view of the message M1, the controller 31 receives the instruction associated with the OK key K65, through the touch panel 23 (OK at S127), and stands by for an additional deposit in the coin vendor (No at S128). When the user additionally deposits a certain amount in the coin vendor, and the coin vendor recognizes the deposition and notifies the image forming apparatus 10 to this effect, along with the additionally deposited amount (Yes at S128), the charging device 32 calculates the permissible number of recording sheets that can be printed within the sum of the amount deposited at S116 and the additionally deposited amount, and updates the permissible number of recording sheets to the value newly calculated (S129). The controller 31 again calculates the number of source document images that can be consolidated into one recording sheet, by dividing the number of source document images ready by the image reading device 11 and stored in the image memory 25, by the permissible number of sheets updated at S129, and calculates, and updates, the reduction rate of the source document images that allows the number of source document images recalculated as above to be consolidated into one recording sheet, on the basis of the recalculated number of source document images, the size of the source document images, and the size of the recording sheet (S130). Thereafter, the operation returns to S122.

Accordingly, the controller 31 again calculates the size of the characters in the source document image to be adopted when the source document images are scaled down at the updated reduction rate and printed on the recording sheet (S122), and decides whether the character size is equal to or larger than the first predetermined size (S123). Upon deciding that character size is equal to or larger than the first predetermined size (Yes at S123), the controller 31 generates the image data in which the recalculated number of source document images are scaled down at the recalculated reduction rate, and consolidated into one page, on the basis of the image data in the image memory 25 representing each of the source document images (S124). The image forming device 12 forms the source document images each represented by the generated image data, on one recording sheet (S125). Thus, the character size equal to or larger than the first predetermined size can be secured, so that the characters in the source document images printed on the recording sheet can be visually recognized.

When the controller 31 again decides that the character size is smaller than the first predetermined size (No at S123), the controller 31 causes the display device 21 to display the warning screen G3 as shown in FIG. 6 (S126), and stands by for an additional deposit in the coin vendor (No at S128).

In contrast, when the user touches the NG key K66 in view of the message in the warning screen G3 shown in FIG. 6, the controller 31 receives the instruction associated with the NG key K66, through the touch panel 23 (NG at S127). The controller 31 then sequentially selects the source document images from the image memory 25, by the number calculated at S117 or S129, and generates the image data in which the source document images are scaled down at the reduction rate calculated at S121 or updated at S130, and consolidated and arranged on one page, on the basis of the image data in the image memory 25, representing each of the mentioned number of source document images (S124). The controller 31 causes the image forming device 12 to acquire the image data generated as above from the image memory 25, and form the source document images each represented by the image data, on one recording sheet (S125). In this case, the characters printed on the recording sheet are smaller than the first predetermined size, and are difficult to visually recognize.

Back to S119, upon deciding that no characters are contained in the source document images (No at S119), the controller 31 sets the amount-based automatic consolidation mode (S131).

In this case, the controller 31 counts the number of source documents read by the image reading device 11 and stored in the image memory 25, and calculates the number of source documents that can be consolidated into one recording sheet, by dividing the number of source documents counted, by the permissible number of sheets calculated at S117. The controller 31 also calculates the reduction rate of the source document images that allows the calculated number of source document images to be consolidated into one recording sheet, on the basis of the number of source document images, the size of the source document images, and the size of the recording sheet (S132). Then the controller 31 sequentially selects the source document images by the number calculated as above, and generates the image data in which the selected source document images are scaled down at the reduction rate calculated as above, and consolidated and arranged on one page, on the basis of the image data in the image memory 25, representing each of the mentioned number of source document images (S133). The controller 31 causes the image forming device 12 to acquire the image data generated as above from the image memory 25, and form the source document images each represented by the image data, on one recording sheet (S134). Thus, the plurality of source document images are distributed to the number of recording sheets that accords with the amount deposited in the coin vendor at S116, and scaled down and consolidated into each of the recording sheets. In addition, the source document images printed on the recording sheet in the reduced size do not contain characters.

In this embodiment, as described above, one of the normal mode, the manual consolidation mode, and the automatic consolidation mode (amount-based automatic consolidation mode or reduction rate-based automatic consolidation mode) can be selected, to print a source document image on one recording sheet, or print a plurality of source document images on one recording sheet, in a reduced size and in a consolidated form.

Now, with the existing image forming apparatus referred to above as background art, although an image edited on the side of the information processing apparatus can be received and printed on the recording sheet by the image forming device, the image forming apparatus is not configured to edit the image. For example, although two images can be consolidated into one page by the information processing apparatus, and each of the images on one page can be transmitted from the information processing apparatus to the image forming apparatus through a network, so that the image forming device of the image forming apparatus can print the images in one page on one recording sheet, the image forming apparatus is not configured to sequentially read the two source document images with the image reading device, consolidate the two source document images into one page, and print the images consolidated into one page on one recording sheet, with the image forming device.

With the image forming apparatus of the different type according to the background art, although a file received from the information processing apparatus and an image read by the scanner can be edited, to be printed on a recording sheet, the image forming apparatus is not configured to sequentially read two source document images with the scanner, consolidate the two source document images into one page, and print the images consolidated into one page on one recording sheet.

With the image forming apparatus according to this embodiment, in contrast, a plurality of source document images can be sequentially read and consolidated into one page, and the images consolidated into one page can be printed on one recording sheet.

Here, in the reduction rate-based automatic consolidation mode described above, the warning screen G3 shown in FIG. 6 is displayed on the display device 21, in the case where the size of the characters in the source document image, adopted when the source document image is scaled down to be printed on the recording sheet, is smaller than the first predetermined size. The user can deposit, in view of the warning screen, an additional amount in the coin vendor to increase the permissible number of recording sheets, so that a fewer number of source document images are consolidated into one recording sheet, and the size of the source document images to be printed on one recording sheet is increased, which allows the characters printed on the recording sheet to be visually recognized. However, conversely, the controller 31 may increase the number of source document images to be consolidated into one recording sheet, when the size of the characters in the source document image, adopted when the source document image is scaled down to be printed on the recording sheet, is still sufficiently large.

Figure 3A:
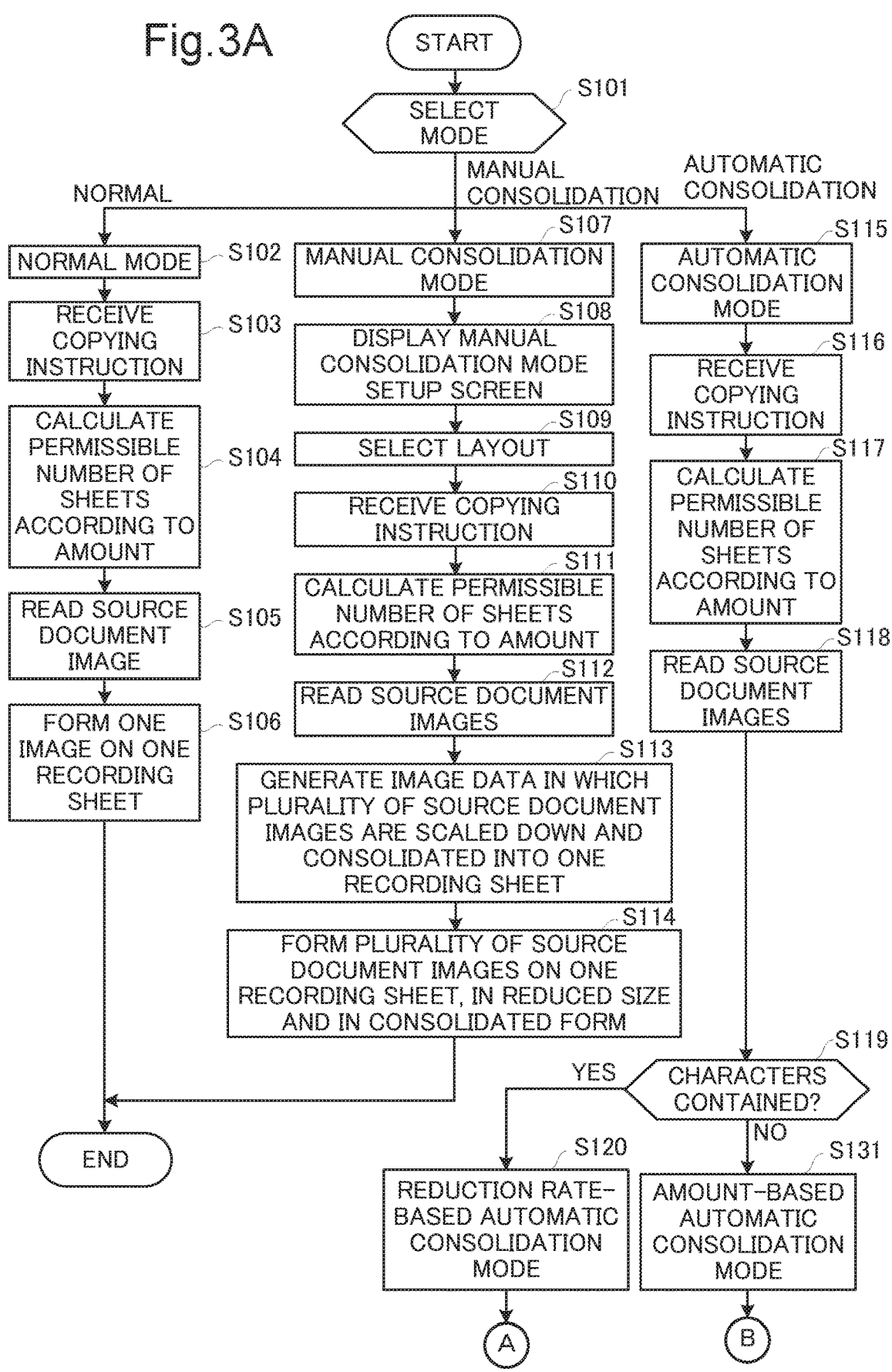
FIG. 3A is a flowchart showing a process of a normal mode, a manual consolidation mode, and an automatic consolidation mode (amount-based automatic consolidation mode and reduction rate-based automatic consolidation mode).
Figure 3B:
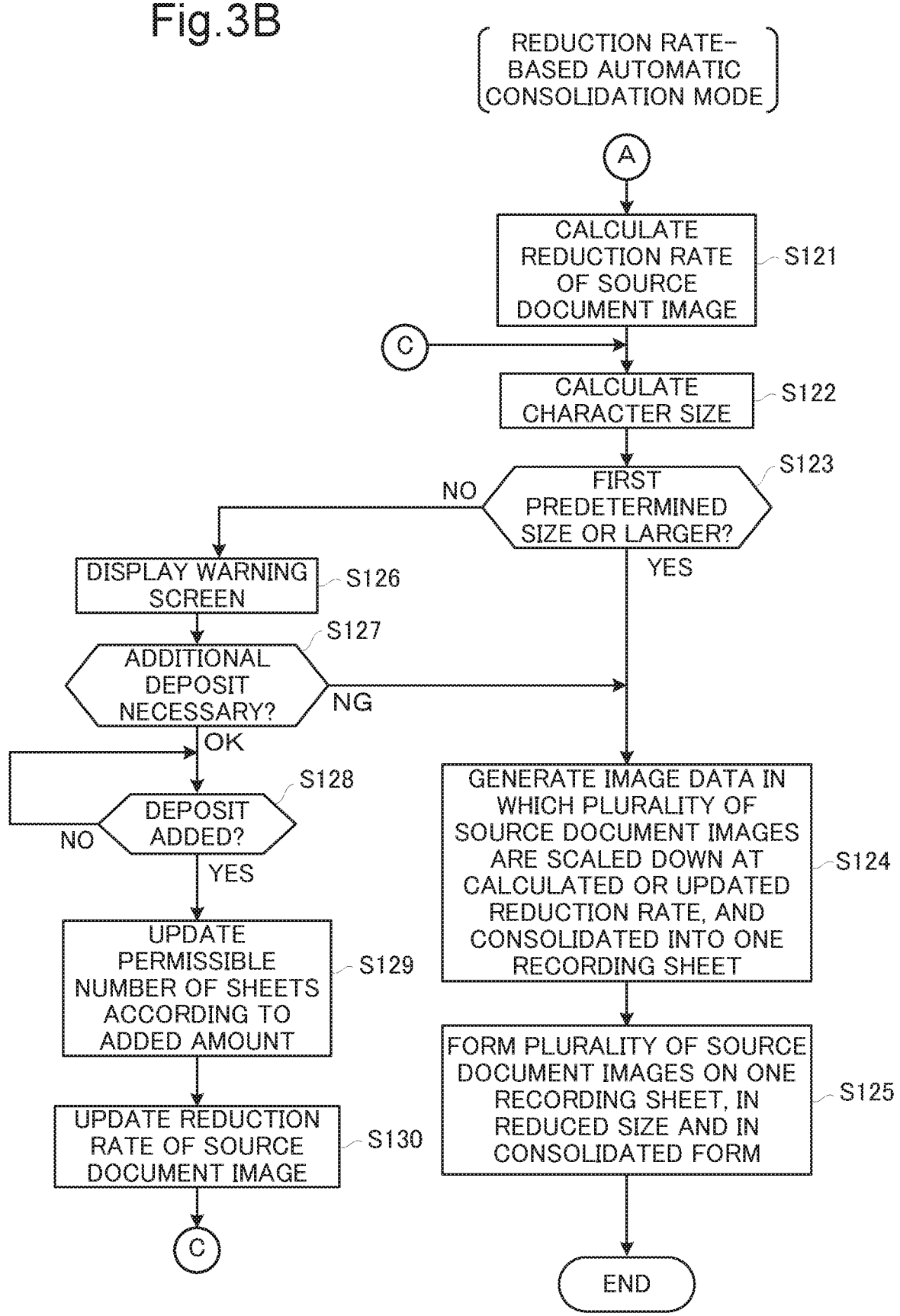
FIG. 3B is a flowchart showing a process that follows the process of FIG. 3A.
Figure 7:
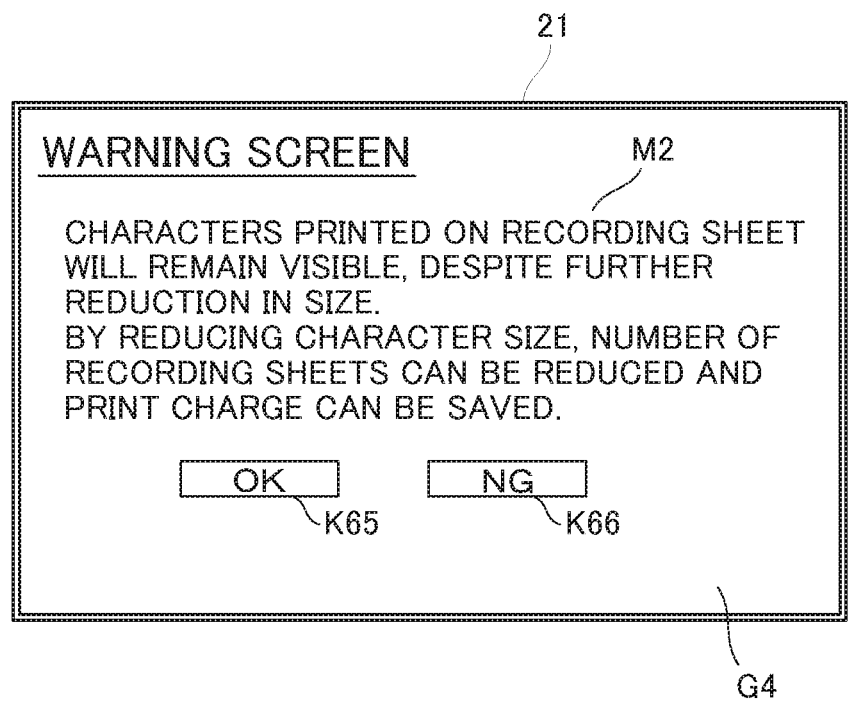
FIG. 7 is a schematic drawing showing another warning screen displayed on the display device.

FIG. 8 is a flowchart showing another process that follows the process of FIG. 3A. For example, when the controller 31 decides that the character size is equal to or larger than the first predetermined size (Yes at S123), the controller 31 may further decide whether the size of the characters in the source document image, adopted when the source document image in the image memory 25 is scaled down to be printed on the recording sheet, is equal to or larger than a second predetermined size, which is sufficiently larger than the first predetermined size (S141). Upon deciding that the character size is equal to or larger than the second predetermined size (Yes at S141), the controller 31 causes the display device 21 to display a warning screen G4, for example as shown in FIG. 7 (S142). The warning screen G4 includes a message M2 to the effect that further reducing the character size of the source document image to the first predetermined size leads to an increase in number of source document images that can be consolidated into one recording sheet, thereby reducing the sum required for printing the source document images, an OK key K65, and an NG key K66. However, when the controller 31 decides that the character size is smaller than the second predetermined size (No at S141), the operation proceeds to S124 shown in FIG. 8.

When the user touches the OK key K65 in view of the message M2, the controller 31 calculates, upon receipt of the instruction associated with the OK key K65, specifically the instruction to reduce the number of recording sheets (e.g., reducing the character size to the first predetermined size), through the touch panel 23 (Yes at S143), the reduction rate that converts the size of the characters in the source document images stored in the image memory 25, to the first predetermined size (S144), and also calculates the number of source document images to be consolidated into one recording sheet, on the basis of the size of the source document image scaled down at the reduction rate calculated as above, and the size of the recording sheet. On the other hand, when the controller 31 receives the instruction not to reduce the number of recording sheets, in other words not to reduce the character size to the first predetermined size (No at S143), the operation proceeds to S124 in FIG. 8.

Then the controller 31 sequentially selects the source document images by the number calculated as above, and generates the image data in which the selected source document images are scaled down at the reduction rate calculated as above, and consolidated and arranged on one page, on the basis of the image data in the image memory 25, representing each of the mentioned number of source document images (S124 in FIG. 8). The controller 31 causes the image forming device 12 to acquire the image data generated as above from the image memory 25, and form the source document images each represented by the image data, on one recording sheet (S125 in FIG. 8). As a result, the source document images containing the characters of the first predetermined size are printed on the recording sheet, and the number of recording sheets is reduced, which leads to reduction in sum required for printing the source document images.

In contrast, when the user touches the NG key K66, the controller 31 receives the instruction associated with the NG key K66, specifically the instruction not to reduce the number of recording sheets, through the touch panel 23, and generates, without changing the reduction rate of the source document image, the image data in which the source document images are scaled down at the currently valid reduction rate, and consolidated and arranged on one page, on the basis of the image data representing each of the source document images in the image memory 25. The controller 31 causes the image forming device 12 to acquire the generated image data from the image memory 25, and form the source document images each represented by the image data, on one recording sheet. Thus, the size of the characters printed on the recording sheet is equal to or larger than the second predetermined size.

In the reduction rate-based automatic consolidation mode, further, a text region (region where characters are arranged) contained in the source document image may be extracted, and the source document image and the extracted text region may be respectively printed on different recording sheets. In this case, the controller 31 extracts, upon deciding that the size of the characters in the source document image, adopted when the source document image is scaled down to be printed on the recording sheet, is smaller than the first predetermined size, all the text regions contained in the source document images in the image memory 25 with the OCR function. Then the controller 31 generates the image data in which the source document images are scaled down at the currently valid reduction rate and consolidated into one page, and also the image data representing all the text regions extracted as above, on the basis of the image data representing each of the source document images in the image memory 25. The image forming device 12 forms the source document images represented by the former image data on the recording sheet, and also prints all the text regions represented by the latter image data, on another recording sheet. Thus, the source document images and the text regions are respectively printed on different recording sheets, and the characters in the text region are exempted from being scaled down.

In this case, the controller 31 may keep in the source document image, or delete therefrom, the characters in the text region extracted from the source document image.

In the foregoing embodiment, a plurality of source document images are scaled down and consolidated into one recording sheet, on the assumption that in this case the recording sheet of the same size as that of the source document is to be utilized. However, the mentioned operation is also feasible when size of the source document is smaller than that of the recording sheet. In other words, the controller 31 may consolidate, provided that it is possible, a plurality of source document images into one recording sheet, without reducing the size of the source document images. In this case, the controller 31 selects, instead of scaling down the plurality of source document images, a recording sheet larger in size than the source documents, to print those images. Examples of such cases include when the size of the source documents is half a size of the recording sheet (e.g., the source document size is B5 and the recording sheet size is B4), and when the size of the source documents is a quarter of a size of the recording sheet (e.g., the source document size is B6 and the recording sheet size is B4).

Further, the configurations and processings described with reference to FIG. 1 to FIG. 8 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
an image reading device that reads a source document image;
an image forming device that forms the source document image read by the image reading device, on a recording sheet; and
a control device including a processor, and configured to act, when the processor executes a control program, as a controller that:
arranges a plurality of source document images sequentially read by the image reading device, in a consolidated form in an area corresponding to one recording sheet; and
causes the image forming device to record the source document images on one recording sheet,
wherein the controller reduces a size of the plurality of source document images sequentially read by the image reading device, to arrange the source document images in a consolidated form in the area corresponding to one recording sheet, wherein the controller is configured to:
- extract characters from the plurality of source document images sequentially read by the image reading device;
- identify a character size to be adopted when the source document images are scaled down and arranged in a consolidated form in the area corresponding to one recording sheet;
- scale down the source document images when the identified character size is equal to or larger than a first predetermined size; and
- cause the image reading device to record the source document images on one recording sheet.

2. An image forming apparatus comprising:

an image reading device that reads a source document image;

an image forming device that forms the source document image read by the image reading device, on a recording sheet; and a control device including a processor, and configured to act, when the processor executes a control program, as a controller that:
- arranges a plurality of source document images sequentially read by the image reading device, in a consolidated form in an area corresponding to one recording sheet; and
- causes the image forming device to record the source document images on one recording sheet, wherein the controller is configured to:
- extract a text region from each of the plurality of source document images sequentially read by the image reading device;
- arrange the source document images, from each of which the text region has been deleted, in a consolidated form in the area corresponding to one recording sheet, and arrange the text region in another area corresponding to one recording sheet; and
- cause the image forming device to record the source document images, from each of which the text region has been deleted, on one recording sheet, and record the text region on another recording sheet.

3. An image forming apparatus comprising:

an image reading device that reads a source document image;

an image forming device that forms the source document image read by the image reading device, on a recording sheet; and a control device including a processor, and configured to act, when the processor executes a control program, as a controller that:
- arranges a plurality of source document images sequentially read by the image reading device, in a consolidated form in an area corresponding to one recording sheet; and
- causes the image forming device to record the source document images on one recording sheet, wherein the controller is configured to:
- extract a text region from each of the plurality of source document images sequentially read by the image reading device;
- arrange the source document images in a consolidated form in the area corresponding to one recording sheet, and arrange the text region in another area corresponding to one recording sheet; and
- cause the image forming device to record the source document images on one recording sheet, and record the text region on another recording sheet.

* * * * *